United States Patent
Shimamura (10) Patent No.: US 6,496,243 B2
(45) Date of Patent: Dec. 17, 2002

(54) ROLLER CARRYING MECHANISM AND PHOTOGRAPHIC PROCESSING DEVICE

(75) Inventor: Yasunobu Shimamura, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 10/083,665

(22) Filed: Feb. 27, 2002

(65) Prior Publication Data

US 2002/0127017 A1 Sep. 12, 2002

(30) Foreign Application Priority Data

Mar. 6, 2001 (JP) ........................................ 2001-061094

(51) Int. Cl.[7] ........................... G03B 27/32; G03B 27/58
(52) U.S. Cl. ............................. 355/18; 355/72; 355/40
(58) Field of Search ............................. 355/32–40, 41, 355/50, 51, 72; 250/589; 271/3.14–3.17, 9.1, 10.09, 10.11, 270

(56) References Cited

U.S. PATENT DOCUMENTS 5,870,174 A 2/1999 Iwasa et al.
6,005,687 A 12/1999 Kawashima et al.

FOREIGN PATENT DOCUMENTS

| EP | 0 684 504 A | 11/1995 |
| JP | 62-094068 A | 4/1987 |
| JP | 09-015768 A | 1/1997 |

*Primary Examiner*—Della J Rutledge
(74) *Attorney, Agent, or Firm*—Smith Patent Office (57) ABSTRACT

A roller carrying mechanism and photographic processing device is presented where pressing rollers 82, 84 are shiftable between a press-contact position at which the pressing rollers 82, 84 are rotated as follows while sandwiching the photographic paper 2 between the driving rollers 81, 83 and a press-contact releasing position at which the pressing rollers 82, 84 are disposed away from the driving rollers 81,83. Since a belt 98 having a circular cross section is extended between the pulleys 96, 97, even when only one of two pressing rollers 82, 84 is at the press-contact position and is rotated in an interlocking manner with one pressing roller. Accordingly, an impact which is applied to the photographic paper 2 when the pressing roller 84 is brought into contact with the photographic paper 2 can be made small.

6 Claims, 5 Drawing Sheets

ROLLER CARRYING MECHANISM AND PHOTOGRAPHIC PROCESSING DEVICE

TECHNICAL FIELD OF THE INVENTION

The present invention relates to a roller carrying mechanism which includes two sets of carrying roller units each having a drive roller and a pressing roller and a photographic processing device which incorporates the roller carrying mechanism therein.

BACKGROUND OF THE INVENTION

Recently, in a digital mini laboratory (photographic processing device), an exposure method which uses an photo print head as an exposure head has been adopted. In performing the exposure using such an exposure method, the photo print head whose exposure range is extended in the main scanning direction is fixed, and a photographic paper is carried in the sub scanning direction which intersects the main scanning direction of the photo print head at a right angle by a first exposure carrying roller unit and a second exposure carrying roller unit each of which includes an exposure driving roller and an exposure pressing roller which are arranged at both sides (upstream side and downstream side in the photographic paper carrying direction) of the photo print head, whereby line exposure is sequentially performed thus completing the surface exposure of an image as a whole.

In such a roller carrying mechanism for photographic paper, the photographic paper during the exposure is transferred to the second exposure carrying roller unit from the first exposure carrying roller unit. For example, in a roller carrying mechanism as described in Japanese Laid-open Patent Publication 15768/1997, until a photographic paper reaches a first exposure carrying roller unit, a first exposure pressing roller maintains a state in which the first exposure pressing roller is brought into pressure contact with a first exposure driving roller due to a spring force to take a standby posture for receiving the photographic paper. When the photographic paper enters, the first exposure pressing roller is displaced due to the entering force of the photographic paper against the spring force and the photographic paper is directly carried to the second exposure carrying roller unit under the clamped and pressed state. In the same manner, before the photographic paper reaches the second exposure carrying roller unit, a second exposure pressing roller also maintains a state in which the second exposure pressing roller is brought into contact with a second exposure driving roller due to a spring force as a standby posture for receiving the photographic paper. Accordingly, when the photographic paper is transferred from the first exposure carrying roller unit to the second exposure carrying roller unit, the second exposure pressing roller is displaced due to the entering pressure of the photographic paper against the spring force and is directly carried in the state that the photographic paper is clamped and pressed.

In the above-mentioned roller carrying mechanism, depending on a distance between the exposure position and the second exposure carrying roller unit, there is a case in which a leading end of the photographic paper during exposure enters the second exposure carrying roller unit. In such a case, the carrying speed of the photographic paper is largely fluctuated due to an impact applied to the photographic paper at the time of clamping the photographic paper with the second exposure carrying roller unit and hence, there arises a problem that the exposure irregularity is generated on the photographic paper so that the image quality is degraded.

In view of the above-mentioned circumstances, it is an object of the present invention to provide a roller carrying mechanism which can suppress the degradation of image quality derived from the clamping of an image holding medium with a second carrying roller unit during exposure.

It is another object of the present invention to provide a photographic processing device which incorporates such a roller carrying mechanism therein.

SUMMARY OF THE INVENTION

To achieve the above-mentioned object, a roller carrying mechanism of the present invention is comprised of a first carrying roller unit which includes a first driving roller, a first pressing roller which is shiftable between a press-contact position at which the first pressing roller clamps an image holding medium between the first pressing roller and the first driving roller and is capable of performing a follower rotation and a press-contact releasing position at which the first pressing roller is released from the first driving roller, and a first pressing roller supporting shaft for supporting the first pressing roller, the first carrying roller unit being arranged at the upstream side of an image processing position, a second carrying roller unit which includes a second driving roller, a second pressing roller which is shiftable between a press-contact position at which the second pressing roller clamps the image holding medium between the second pressing roller and the second driving roller and is capable of performing a follower rotation and a press-contact releasing position at which the second pressing roller is released from the second driving roller, and a second pressing roller supporting shaft for supporting the second pressing roller, the second carrying roller unit being arranged at the downstream side of the image processing position, and a shaft coupling unit which couples the first pressing roller supporting shaft and the second pressing roller supporting shaft such that both pressing rollers are rotated in the same direction even when only one of the first pressing roller and the second pressing roller is held at the press-contact position.

According to the present invention, since the second pressing roller is shiftable between the press-contact position and the press-contact releasing position, by shifting the second pressing roller from the press-contact releasing position to the press-contact position after a leading end of an image holding medium passes between the second pressing roller and the second driving roller, an impact which is given to the image holding medium can be reduced so that the fluctuation of the carrying speed of the image holding medium can be made relatively small.

Further, since the first pressing roller supporting shaft and the second pressing roller supporting shaft are coupled to each other by means of the shaft coupling unit, by making the first pressing roller assume the press-contact position, it is possible to make the second pressing roller rotated in the carrying direction of the image holding medium. Accordingly, by making the first pressing roller assume the press-contact position at the time of shifting the second pressing roller from the press-contact releasing position to the press-contact position, it is possible to bring the image holding medium carried from the first carrying roller unit side into contact with the second pressing roller rotated in the carrying direction of the image holding medium. Eventually, an impact that the image holding medium receives from the second pressing roller can be made extremely small so that the carrying speed of the image holding medium is hardly fluctuated. Accordingly, drawbacks such as the exposure irregularity on the image holding medium and the reading irregularity on the image holding medium are hardly generated thus enhancing the image quality.

Further, since the first pressing roller is shiftable between the press-contact position and the press-contact releasing position, by shifting the first pressing roller from the press-contact position to the press-contact releasing position before a rear end of the image holding medium passes between the first pressing roller and the first driving roller, an impact applied to the image holding medium at the time of discharging the image holding medium from the first carrying roller unit can be reduced so that the fluctuation of the carrying speed of the image holding medium can be made relatively small.

In the present invention, the roller carrying mechanism may adopt the shaft coupling unit which includes a first pulley which is supported on the above-mentioned first pressing roller supporting shaft, a second pulley which is supported on the above-mentioned second pressing roller supporting shaft and a belt which is extended between the above-mentioned first pulley and the above-mentioned second pulley.

According to such a constitution, since the first and second pressing rollers are connected by means of the belt, compared to a case in which the pressing rollers are connected to each other by simply bringing these rollers into contact with each other, the rotation between these two pressing rollers can be surely transmitted.

Further, the roller carrying mechanism of the present invention may be further comprising a first one-way clutch which is disposed in a transmission system arranged between the above-mentioned belt and the above-mentioned second pressing roller and makes the above-mentioned second pressing roller perform idling with respect to the belt in the carrying direction of the above-mentioned image holding medium. Here, it is preferable that, a surface speed of the above-mentioned second pressing roller which is rotatably driven by way of the above-mentioned belt when only the above-mentioned first pressing roller assures the press-contact position is set smaller than a surface speed of the above-mentioned first pressing roller.

In the above-mentioned constitution which connects two pressing rollers using the belt, when the carrying speed is different between the first carrying roller unit and the second carrying roller unit due to the irregularity of machining accuracy of parts, an undesired force is applied to respective parts or the image holding medium due to the difference in the carrying speed between both carrying roller units and this brings about the degradation of the image quality. Accordingly, in the present constitution, the roller carrying mechanism is provided with the first one-way clutch which absorbs the difference in carrying speed between two carrying roller units derived from the irregularity of machining accuracy of parts and, at the same time, to ensure the reliable functioning of the one-way clutch, the surface speed of the second pressing roller which is rotatably driven by way of the belt when only the first pressing roller assumes the press-contact position is set smaller than the surface speed of the first pressing roller. That is, due to such a constitution, even when the carrying speed of the first carrying roller unit is greater than the carrying speed of the second carrying roller unit in the state that both of the first and second pressing rollers assume the press-contact position, the difference in the carrying speed between both units can be absorbed by the one-way clutch and hence, the undesired force is hardly applied to respective parts.

Further, when the image holding medium which is carried to the second carrying roller unit from the first carrying roller unit is brought into contact with the second pressing roller in the state that the first and second pressing rollers assume the press-contact position, the first one-way clutch functions so as to allow the second pressing roller to perform idling with respect to the belt whereby there is no fear that a large impact is applied to the image holding medium due to the contact of the image holding medium with the second pressing roller. Accordingly, drawbacks such as the exposure irregularity on the image holding medium and the image reading irregularity on the image holding medium can be hardly generated thus further enhancing the image quality.

The roller carrying mechanism of the present invention may preferably be further comprising a second one-way clutch which is disposed in a transmission system arranged between the above-mentioned belt and the above-mentioned first pressing roller and makes the above-mentioned first pressing roller perform idling with respect to the above-mentioned belt in the direction opposite to the carrying direction of the above-mentioned image holding medium.

In case that the roller carrying mechanism of the present invention adopts the constitution which uses the previously-mentioned first one-way clutch, when the state of the first and second rollers is changed from the state in which both of the first and second pressing rollers are at the press-contact position to the state in which only the second pressing roller is at the press-contact position, the angular velocity of the first pressing roller becomes faster than the angular velocity of the second pressing roller. Accordingly, when a portion of the image holding medium in the vicinity of a rear end thereof is brought into contact with the first pressing roller, there is a possibility that the image holding medium is pushed to the downstream side and hence, the carrying speed of the image holding medium is fluctuated. To the contrary, according to this constitution, even when the state of the first and second pressing rollers is changed from the state in which both of the first and second pressing rollers are at the press-contact position to the state in which only the second pressing roller is at the press-contact position, the second one-way clutch functions so that there is no possibility that the angular velocity of the first pressing roller becomes faster than the angular velocity of the second pressing roller. Accordingly, even when the portion of the image holding medium in the vicinity of the rear end thereof is brought into contact with the first pressing roller, there is no possibility that the image holding medium is pushed to the downstream side and hence, the carrying speed of the image holding medium is not fluctuated. Accordingly, drawbacks such as the exposure irregularity on the image holding medium and the image reading irregularity on the image holding medium can be hardly generated thus further enhancing the image quality.

In the roller carrying mechanism of the present invention, the diameter of the above-mentioned second pulley may be larger than the diameter of the above-mentioned first pulley. Due to such a constitution, the constitution in which the surface speed of the second pressing roller rotatably driven by way of the belt when only the first pressing roller is at the press-contact position is set smaller than the surface speed of the first pressing roller can be easily realized by adjusting the diameters of the first and second pulleys.

Further, the present invention is also applicable to a photographic processing device which incorporates any one of the above-mentioned roller carrying mechanisms. Due to such a photographic processing device, the exposure irregularity on a photographic paper as the image holding medium is hardly generated and hence, it is possible to output a print of high quality.

Other and further objects, features and advantages of the present invention will appear more fully from the following description taken in conjunction with the accompanying drawings.

DESCRIPTION OF THE PREFERRED EMBODIMENTS

One preferred embodiment of the present invention is explained in conjunction with attached drawings hereinafter.

Figure 1:
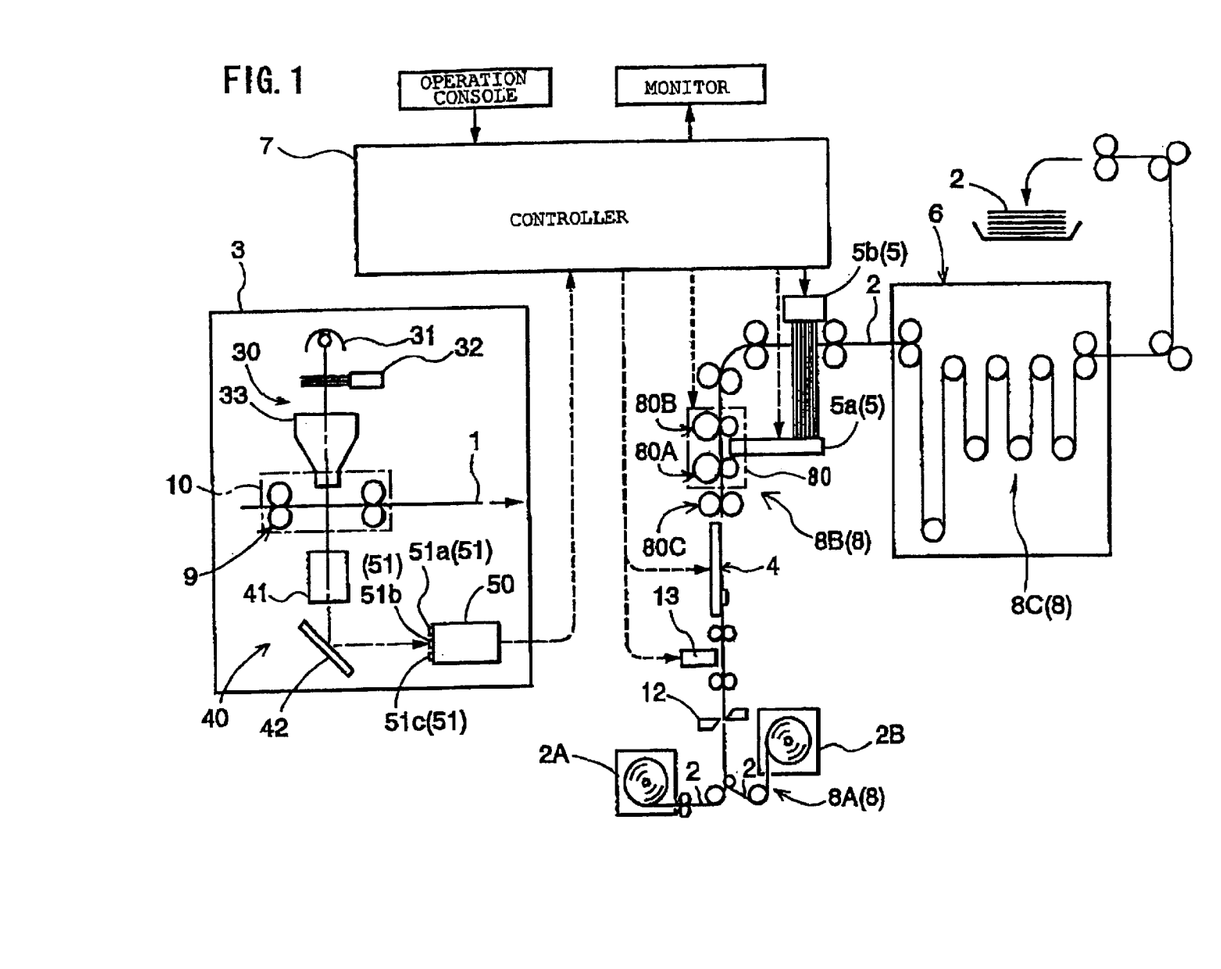
FIG. 1 is a schematic block diagram of a printer processor which mounts a roller carrying mechanism according to one embodiment of the present invention therein.

FIG. 1 is a schematic block diagram of a printer processor as a photographic processing device which mounts a roller carrying mechanism according to one embodiment of the present invention therein. This digital mini laboratory adopts a digital exposure method in an exposure part and includes, in this embodiment, a film scanner 3 which reads a photographic image from image frames of a photographic film (hereinafter referred to as "film") 1 which is subjected to developing processing by a film developer not shown in the drawing, a controller 7 which prepares print data by processing digital image data read through the film scanner 3, a digital print part 5 which has an exposure head 5a exposing an image corresponding to the frame image on a photographic paper 2 in response to the print data, and a developing processing part 6 which performs the developing processing of the exposed photographic paper 2. The photographic paper 2 which is developed by the developing processing part 6 is discharged as a finished print through a drying step.

The film scanner 3 includes, as main components thereof, an illumination optical system 30, an image pick-up optical system 40, a photoelectric conversion part 50 which uses a line CCD sensor 51 as a photoelectric conversion element, and an auto film mask 10 which determines an irradiation range of light with respect to the film 1 and also carries the film 1 in the sub scanning direction for scanning by the line CCD sensor 51.

The illumination optical system 30 is comprised of a halogen lamp 31 which constitutes a white light source, a light adjustment filter 32, a mirror tunnel 33 or the like and irradiates light beams from the light source to the film 1 after adjusting the color distribution and the intensity distribution of the light beams. The image pick-up optical system 40 which processes the light beams which have transmitted through the film 2 is comprised of a lens unit 41 and a mirror 42 which changes the direction of the light.

The photoelectric conversion part 50 which performs the photoelectric conversion of the light beams guided by the image pick-up optical system 40 includes three CCD sensors 51a, 51b, 51c which are allocated to detect respective colors of R (red), G (green), B (blue) as the line CCD sensors 51. In each CCD sensor, a large number (for example, 5000 pieces) of CCD elements are arranged in the main scanning direction, that is, in the widthwise direction of the film 1. A color filter which allows only a red component of the light which has passed through the film 1 to pass therethrough is formed on an image pick-up surface of the CCD sensor 51a for red, a color filter which allows only a green component of the light which has passed through the film 1 to pass therethrough is formed on an image pick-up surface of the CCD sensor 51b for green, and a color filter which allows only a blue component of the light which has passed through the film 1 to pass therethrough is formed on an image pick-up surface of the CCD sensor 51c for blue. These CCD sensors 51a, 51b, 51c respectively performs the photoelectric conversion of only the red component, the green component and the blue component respectively.

When the frame image of the film 1 is positioned at a scanning position set in the automatic film mask 10, the reading processing of the frame image is started and the transmitting light of the frame image is sequentially read by three CCD sensors 51a, 51b, 51c by feeding the film 1 using a film carrying mechanism 9. Here, since the respective CCD sensors are arranged at an interval of several pixels along the carrying direction of the film 1, although time lags are generated with respect to the detection timings of respective component colors of R, G, B in the same pixel, these timings are stored in a given memory of the controller 7 such that they are made to correspond to R, G.B image signals of the same pixel due to the signal processing performed in a latter stage of the photoelectric conversion part 50. Respective controls of the illumination optical system 30, the image pick-up optical system 40 and the photoelectric conversion part 50 of the film scanner 3 can be performed by the controller 7.

The digital print part 5 adopts a PLZT shutter method in this embodiment. That is, an exposure head 5a adopts a shutter array made of PLZT elements. The shutter array consisting of the PLZT elements is constituted of transparent ferroelectric ceramic material which is obtained by adding lead-zirconate-titanate. The shutter array makes use of the electro-optic effect that this material has and light of respective colors R, G, B is guided to respective shutters from the light source 5b by way of a large number of optical fibers. This shutter array is extended in the widthwise direction of the photographic paper 2, that is, in the direction which transverses the carrying direction of the photographic paper 2. Respective shutters assume the light transmitting state when a voltage of a given level is applied to the respective shutters and assume the light interruption state when the applying of the voltage is stopped. Accordingly, when the driving voltages are applied to the shutters corresponding to respective pixels in response to the print data from the controller 7, the shutters are opened and the light of colors guided by the light source is irradiated to the photographic paper 2. The light source 5b is provided with a rotary filter consisting of optical filters of three colors R, G, B. By performing the rotational phase control of the rotary filter, one of optical filters of three colors R, G, B is selectively made to face the light source so that the light of the selected color is supplied to the shutter through an optical fiber by way of the filter of the color. As the method which the digital print part can adopt, besides the PLZT shutter method, a liquid crystal shutter method, a fluorescent beam method, a FOCRT method, a DMD (Digital Micro mirror Device)

method, a laser beam method and the like have been known. Any method can be selected at the time of designing depending on the specification on exposure.

The digital print part 5 can simultaneously expose respective cut photographic papers 2 which are arranged in two rows and hence, a photographic paper carrying line 8 is divided into a photographic paper supply line 8A which carries the cut photographic papers 2 in a single row, an exposure carrying line 8B which is capable of carrying the cut photographic papers 2 in two rows, and a developing carrying line 8c. Between the photographic paper supply line 8A and the exposure carrying line 8B, a sorting device 4 which sorts the photographic papers 2 sequentially supplied from the photographic supply line 8A to respective rows of the exposure carrying line 8B is disposed.

The photographic paper supply line 8A is comprised of a drawing carrying part which consists of a group of rollers which selectively draw out the photographic paper 2 from either one of two photographic paper magazines 2A and 2B which store photographic papers 2 in a roll form with emulsion surfaces thereof outside and a pre-sorting carrying part which transfers the photographic paper 2 to the sorting device 4.

At the upstream end of the pre-sorting carrying part, a paper cutter 12 which cuts the photographic paper 2 drawn out from the photographic paper magazine 2A or 2B in conformity with a print size is provided, while at the downstream end of the paper cutter 12, a back print part 13 is provided. The back print part 13 prints a film ID, a frame number and correction information which indicates image processing performed at the time of preparing print data and the like on a back surface (non-emulsion surface) of the photographic paper 2. Usually, a dot impact printer is used as such a back print part 13.

The sorting device 4 is constituted of a chucker-type X-Y moving mechanism which receives the photographic paper 2 cut by a paper cutter 12 and alternately transfers the cut photographic paper 2 to left and right row positions of an intermediate carrying roller unit 80C. It is needless to say that when the large-sized photographic paper 2 having the wide width is handled, the exposure is performed at one row and hence, what is necessary is only to directly transfer the photographic paper 2 received from the photographic paper supply line 8A to the intermediate carrying roller unit 80C.

The exposure carrying line 8B includes the intermediate carrying roller unit 80C which constitutes a two-row entry area of the exposure carrying line 8B and a first exposure carrying roller unit 80A at an inlet side and a second exposure carrying roller unit 80B at an outlet side which are arranged to sandwich the exposure head 5a of the digital print part 5. In this embodiment, the first exposure carrying roller unit 80A at the inlet side and the second exposure carrying roller unit 80B at the outlet side which particularly give the large influence to the exposure quality are, as shown in FIG. 2, manufactured at high accuracy as an integral unit which is referred to as the roller carrying mechanism 80 for exposure.

Figure 2:
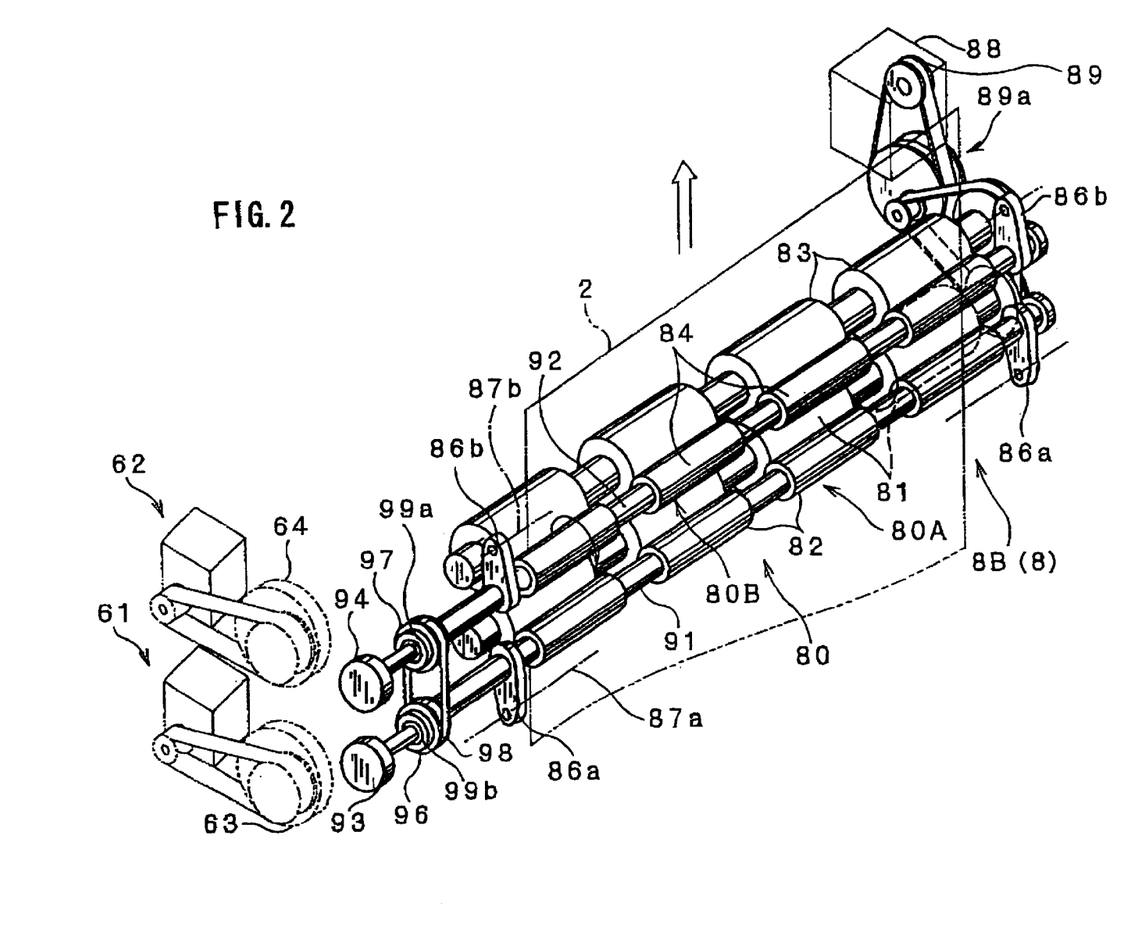
FIG. 2 is a perspective view of a roller carrying mechanism shown in FIG. 1.

As shown in FIG. 2, the roller carrying mechanism 80 of this embodiment includes the first exposure carrying roller unit 80A which is arranged at the upstream side of the exposure position and the second exposure carrying roller unit 80B which is arranged at the downstream side of the exposure position. The first exposure carrying roller unit 80A includes four first exposure driving rollers 81 which are brought into contact with non-emulsion surface side of the cut photographic paper 2 and four first exposure pressing rollers 82 which are shiftable toward or away from these first exposure driving rollers 81. On the other hand, the second exposure carrying roller unit 80B includes four second exposure driving rollers 83 (having a diameter substantially as same as a diameter of the first exposure driving rollers 81) which are brought into contact with non-emulsion surface side of the cut photographic paper 2 and four second exposure pressing rollers 84 (having a diameter substantially as same as a diameter of the first exposure pressing rollers 82) which are shiftable toward or away from these second exposure driving rollers 83.

The first and second exposure driving rollers 81, 83 are synchronously driven at the substantially same angular velocity in the direction to carry the photographic paper 2 toward the downstream side (upper side in FIG. 2) by a belt transmission mechanism 89a driven by one driving pulley 89 connected to a motor 88.

The first and second exposure pressing rollers 82, 84 are respectively supported on the shafts 91, 92 which are extended in the horizontal direction. The shaft 91 is supported by a pair of tilting arms 86a so that the shaft 91 is tiltable around a tilt axis 87a which is disposed below the shaft 91 and is extended parallel to the shaft 91. On the other hand, the shaft 92 is supported by a pair of tilting arms 86b so that the shaft 92 is tiltable around a tilt axis 87b which is disposed above the shaft 92 and is extended parallel to the shaft 92. Due to such tilting, the first and second exposure pressing rollers 82, 84 are shifted toward or away from the first and second exposure driving rollers 81, 83 so that the first and second exposure pressing rollers 82, 84 can selectively assume the press-contact position at which the first and second exposure pressing rollers 82, 84 are brought into contact with the first and second exposure driving rollers 81, 83 and the press-contact releasing position at which the first and second exposure pressing rollers 82, 84 are released from the first and second exposure driving rollers 81, 83. Here, both of the tilting arms 86a, 86b are biased by springs (not shown in the drawing) such that the first and second exposure pressing rollers 82, 84 are shifted in the pressing direction.

Disc-like rollers 93, 94 are respectively mounted on one ends of the shafts 91, 92. In the vicinity of the rollers 93, 94, eccentric cam plates 63, 64 which are respectively supported on two cam mechanism 61, 62 are disposed. Upon driving of the cam mechanisms 61, 62, the eccentric cam plates 63, 64 and the rollers 93, 94 repeat the contact state and the non-contact state at a given phase difference from each other and hence, the first and second exposure pressing rollers 82, 84 are shifted between the press-contact position and the press-contact releasing position.

Further, in the vicinity of rollers 93, 94 of the shafts 91, 92, pulleys 96, 97 are respectively supported. A belt 98 having a round cross section is extended between two pulleys 96, 97. Accordingly, two shafts 91, 92 and the first and second exposure pressing rollers 82, 84 which are supported on two shafts 91, 92 are rotated each other in an interlocking manner. That is, even when one of the first and second exposure pressing rollers 82, 84 is rotated as followers by the first and second exposure driving rollers 81, 83 in the press-contact position, the other exposure pressing roller in the press-contact releasing position is also rotated in the same direction as one exposure pressing roller.

In this embodiment, the diameter of the pulley 97 is set larger than the diameter of the pulley 96 such that a surface speed of the second exposure pressing roller 84 (that is, a carrying speed of the photographic paper 2 in the second exposure carrying roller unit 80B) in the state that only one of the first and second exposure pressing rollers 82, 84 is at the press-contact position becomes smaller than a surface speed of the first exposure pressing roller 82 (that is, a carrying speed of the photographic paper 2 in the first exposure carrying roller unit 80A) by 1–10%, preferably 1–4.5%, and more preferably 2–4.5%. In this embodiment, the diameters of two pulleys 96, 97 are set different from each other and hence, a one-way clutch 99a which will be explained later surely functions.

Figure 3:
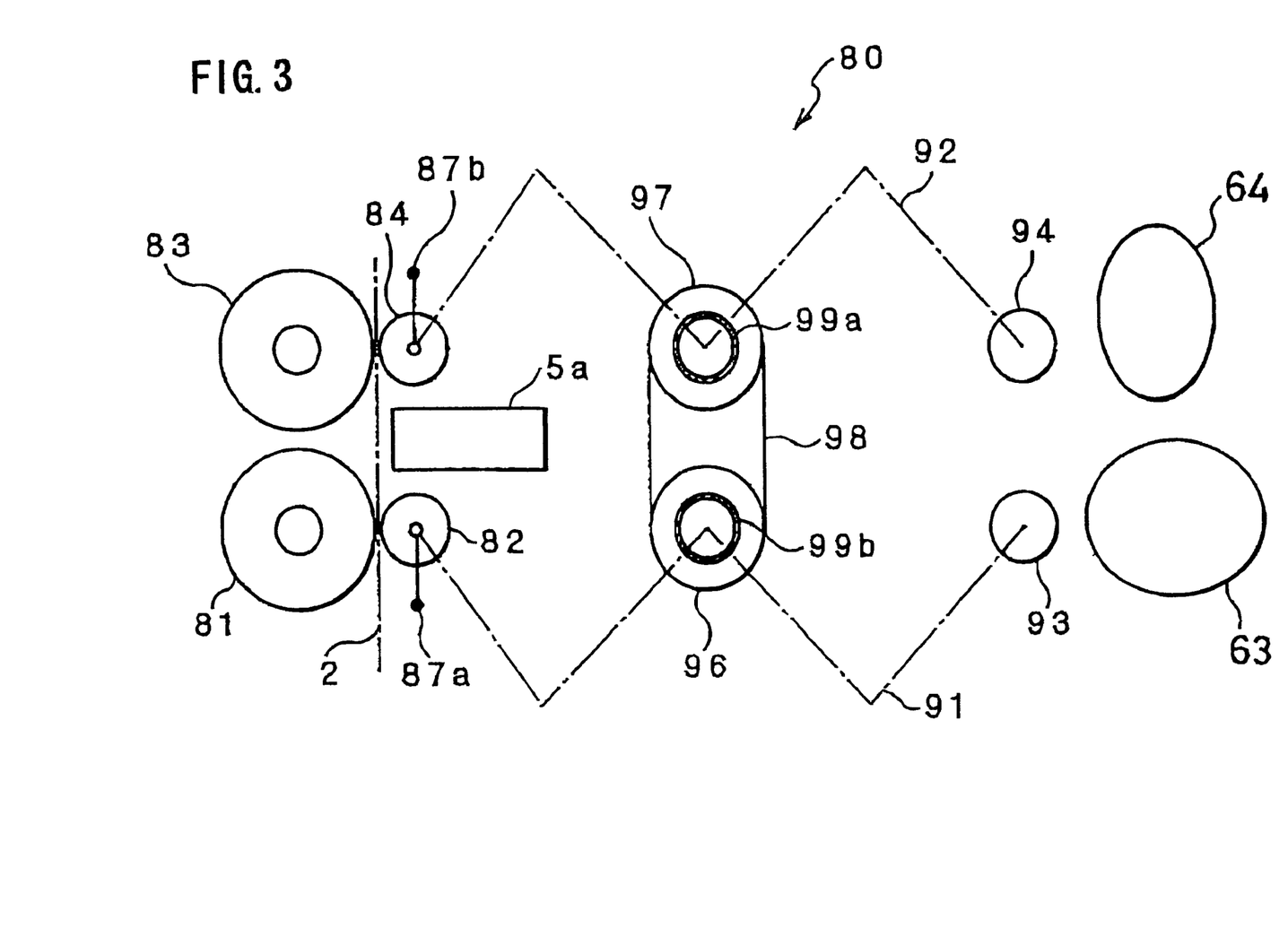
FIG. 3 is a schematic view of a transmission system of the roller carrying mechanism shown in FIG. 1.
Figure 4:
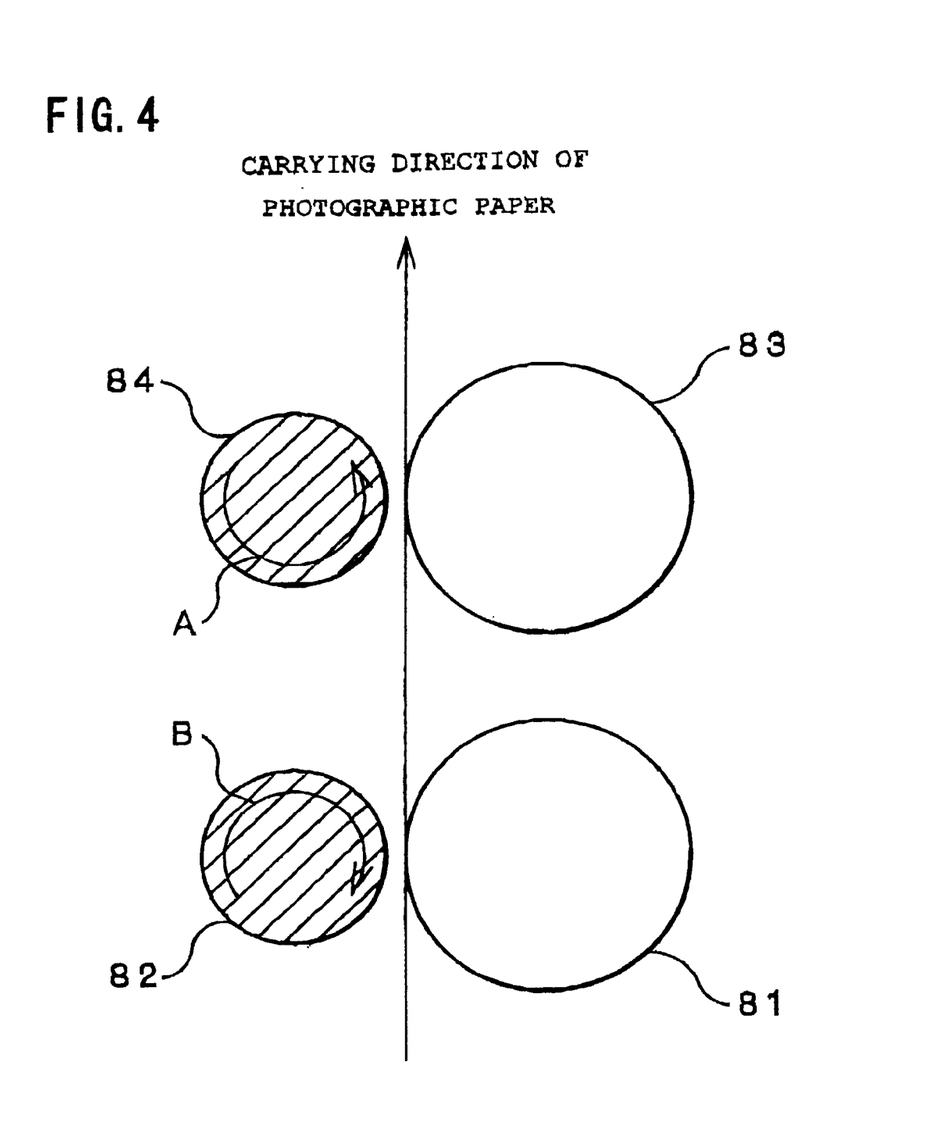
FIG. 4 is a schematic view for explaining acting directions of two one-way clutches used in the roller carrying mechanism shown in FIG. 1.

Further, in this embodiment, as also shown in FIG. 3, which is a schematic view of a transmission system of the roller carrying mechanism shown in FIG. 1, the one-way clutch 99a is arranged between the shaft 92 and the pulley 97. This one-way clutch 99a allows the second exposure pressing roller 84 to be rotated at an angular velocity larger than that of the belt 98 in the carrying direction of the photographic paper 2, but prohibits the belt 98 from being rotated at an angular velocity larger than that of the second exposure pressing roller 84. That is, with the provision of the one-way clutch 99a, the second exposure pressing roller 84 can perform idling in the direction indicated by an arrow A in FIG. 4 relative to the belt 98. Due to such a constitution, as will be explained later, it is possible to prevent the generation of a phenomenon that, in the state that both of the first and second exposure pressing rollers 82, 84 are at the press-contact position, an excessive force is applied to the members such as the belt 98 and the first and second exposure pressing rollers 82, 84 or the photographic paper 2 which is carried at a relatively large carrying speed is brought into contact with the second exposure pressing roller 84 which is rotated at the surface speed smaller than the carrying speed so that a large impact is applied to the photographic paper 2.

Further, in this embodiment, also as shown in FIG. 3, a one-way clutch 99b is arranged between the shaft 91 and the pulley 96. This one-way clutch 99b allows the first exposure pressing roller 82 to be rotated at an angular velocity smaller than that of the belt 98 in the carrying direction of the photographic paper 2, but prohibits the belt 98 from being rotated at an angular velocity smaller than that of the first exposure pressing roller 82. That is, with the provision of the one-way clutch 99b, the first exposure pressing roller 82 can perform idling in the direction indicated by an arrow B in FIG. 4 relative to the belt 98 (however, the actual rotating direction of the first exposure pressing roller 82 is the direction equal to the direction indicated by the arrow A). Due to such a constitution, as will be explained later, it is possible to prevent the generation of a phenomenon that, when the state of the first and second exposure pressing rollers 82, 84 is changed from the state in which both of the first and second exposure pressing rollers 82, 84 are at the press-contact position to the state in which only the second exposure pressing roller 84 is at the press-contact position, a portion of the photographic paper 2 in the vicinity of a rear end thereof is brought into contact with the first exposure pressing roller 82 so that the photographic paper 2 is pushed to the downstream side.

Then, the manner of operation of the roller carrying mechanism 80 of this embodiment is further explained in conjunction with FIG. 5(a) to FIG. 5(d). Here, in the following explanation, the operation timing of the first and second exposure pressing rollers 82, 84 is controlled by cam mechanisms 61, 62.

When the exposure step is started, the photographic paper 2 to be exposed is carried to the roller carrying mechanism 80 by the intermediate carrying roller unit 80C. Here, as shown in FIG. 5(a), the first exposure pressing roller 82 is at the press-contact position and the second exposure pressing roller 84 is at the press-contact releasing position. Accordingly, along with the rotation of the first exposure pressing roller 82, the second exposure pressing roller 84 is also rotated in the carrying direction of the photographic paper 2 in an interlocking manner with the first exposure pressing roller 82 by way of the belt 98. Here, since the diameter of the pulley 97 is set larger than the diameter of the pulley 96, the surface speed of the second exposure pressing roller 84 is made lower than the surface speed of the first exposure pressing roller 82. In the state shown in FIG. 5(a), neither of these one-way clutches 99a, 99b functions.

Then, when the leading end of the photographic paper 2 is carried upwardly after passing through the exposure position and passes through a gap defined between the second exposure pressing roller 84 and the second exposure driving roller 83, as shown in FIG. 5(b), the second exposure pressing roller 84 is shifted to the press-contact position. Here, although the exposure is performed with respect to the photographic paper 2 by the exposure head 5a, the second exposure pressing roller 84 is rotated as the follower in the same direction as the carrying direction of the photographic paper 2 and the surface speed of the rotation is set smaller than the surface speed of the first exposure pressing roller 82 (that is, the carrying speed of the photographic paper 2) and hence, the one-way clutch 99a surely functions so that the second exposure pressing roller 84 is rotated at an angular velocity larger than that of the belt 98 in the carrying direction of the photographic paper 2 (performs idling with respect to the belt 98). Accordingly, even when the photographic paper 2 which is carried at a carrying speed which is larger than the surface speed of the second exposure pressing roller 84 impinges on the second exposure pressing roller 84, there is no fear that a large impact is applied to the photographic paper 2 from the second exposure pressing roller 84. Accordingly, no wrinkles and deflections are generated on the photographic paper 2 so that there is substantially no possibility that the shifting of the second exposure pressing roller 84 to the press-contact position adversely affects the exposure.

Further, when the second exposure pressing roller 84 is shifted to the press-contact position and clamps the photographic paper 2 between the second exposure pressing roller 84 and the second exposure driving roller 83, the surface speed of the rotation of the second exposure pressing roller 84 is rapidly increased to a speed which is substantially as same as the surface speed of the second exposure driving roller 83. Here, the one-way clutch 99a also functions. That is, the one-way clutch 99a performs idling with respect to the belt 98 such that the difference between a surface speed of the first exposure pressing roller 82 (that is, a carrying speed of the first exposure carrying roller unit 80A) and a surface speed of the second exposure pressing roller 84 (that is, a carrying speed of the second exposure carrying roller unit 80B) can be absorbed. Accordingly, there is no fear that an undesired force is applied to the members such as the belt 98 and the second exposure pressing roller 84.

Subsequently, after the second exposure pressing roller 84 assumes the press-contact position, as shown in FIG. 5(c), the first exposure pressing roller 82 is shifted to the press-contact releasing position. This operation is performed due to a following reason. When the first exposure pressing roller 82 is held at the press-contact position when the photographic paper 2 leaves the first exposure pressing roller 82, the rear end of the photographic paper 2 is pushed upwardly by the first exposure pressing roller 82 and the first exposure driving roller 81 so that there is a fear that the carrying speed of the photographic paper 2 is rapidly changed. Such a fear can be prevented by preliminarily shifting the first exposure pressing roller 82 to the press-contact releasing position.

In this manner, when the first exposure pressing roller 82 is shifted to the press-contact releasing position, since the first exposure pressing roller 82 is interlocked with the second exposure pressing roller 84 by way of the belt 98, the angular velocity of the first exposure pressing roller 82 becomes larger than the angular velocity of the second exposure pressing roller 84 (here, the one-way clutch 99*a* has already stopped the function thereof). Accordingly, provided that the roller carrying mechanism 80 has no one-way clutch 99*b*, assuming that a portion of the photographic paper 2 in the vicinity of the rear end thereof is brought into contact with the first exposure pressing roller 82, the photographic paper 2 is pushed to the downstream side at a speed faster than the surface speed of the second exposure pressing roller 84 so that even in the state that the exposure is performed by the exposure head 5*a*, the carrying speed of the photographic paper 2 is fluctuated. To the contrary, in this embodiment, the one-way clutch 99*b* is arranged at the above-mentioned position and hence, the first exposure pressing roller 82 performs idling with respect to the belt 98 and continues to maintain the angular velocity substantially as same as the angular velocity of the second exposure pressing roller 84 so that there is no possibility that the angular velocity of the first exposure pressing roller 82 becomes faster than the angular velocity of the second exposure pressing roller 84. Accordingly, even when the portion of the photographic paper 2 in the vicinity of the rear end portion thereof is brought into contact with the first exposure pressing roller 82, the photographic paper 2 is not pushed to the downstream side so that the carrying speed of the photographic paper 2 is not fluctuated.

Figure 5:
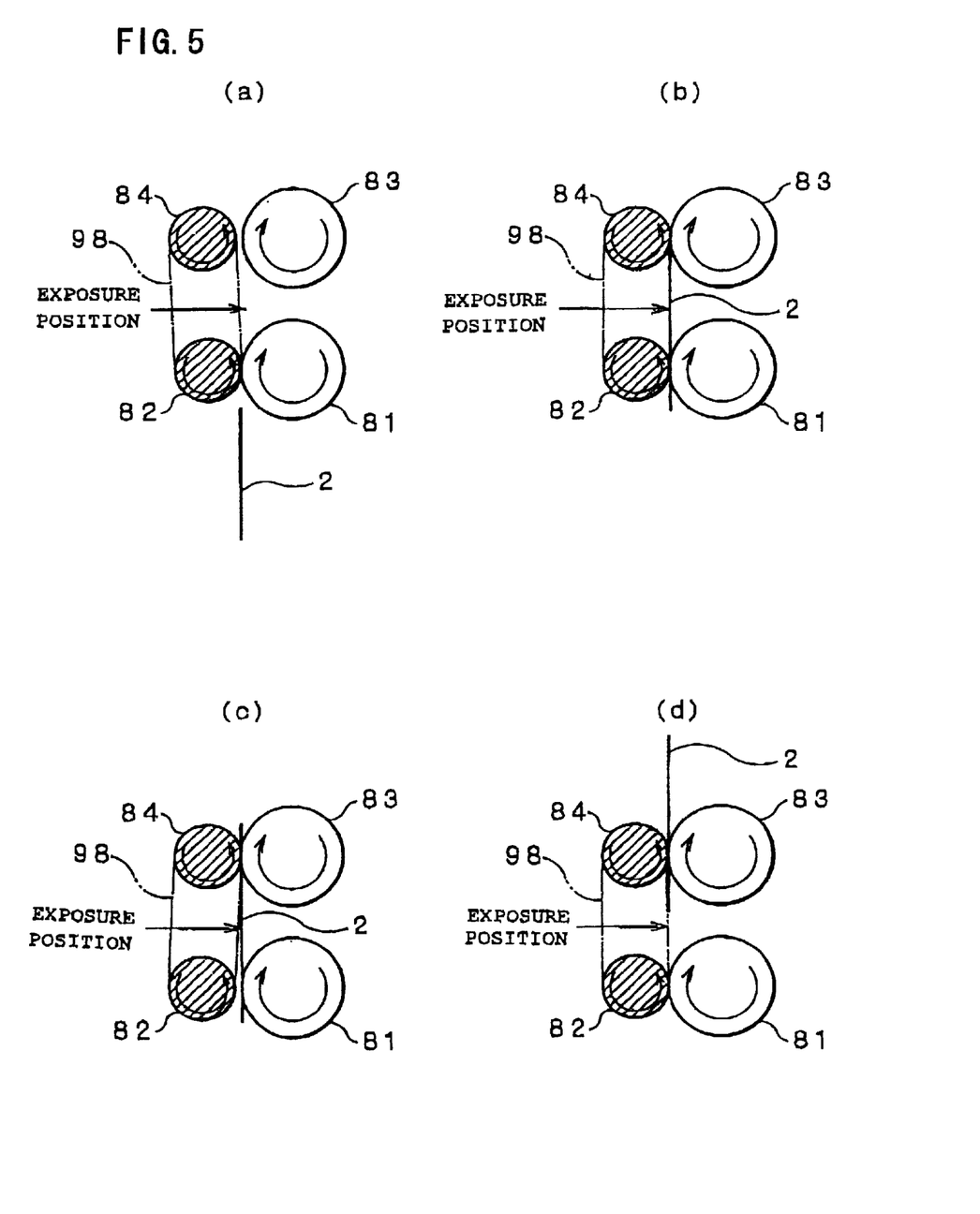
FIG. 5 is a schematic view for explaining the manner of operation of the roller carrying mechanism shown in FIG. 1.

Then, after the rear end of the photographic paper 2 has completely passed through the gap between the first exposure pressing roller 82 and the second exposure pressing roller 84, as shown in FIG. 5(*d*), the first exposure pressing roller 82 is made to return again to the press-contact position to clamp a next photographic paper 2.

In this manner, according to this embodiment, since the first exposure pressing roller 82 and the second exposure pressing roller 84 can be shifted between the press-contact position and the press-contact releasing position, by changing over the press-contact position and the press-contact releasing position of these pressing rollers at the proper timings, the impact applied to the photographic paper 2 can be reduced and the fluctuation of the carrying speed of the photographic paper 2 can be made relatively small.

Further, in this embodiment, since the first exposure pressing roller 82 and the second exposure pressing roller 84 are connected with each other by means of the belt 98, even when one pressing roller is at the press-contact position, the other pressing roller is rotated in an interlocking manner with one pressing roller. Accordingly, by making the first exposure pressing roller 82 assume the press-contact position at the time of shifting the second exposure pressing roller 84 from the press-contact releasing position to the press-contact position, it is possible to bring the photographic paper 2 carried from the first exposure carrying roller unit 80A side into contact with the second exposure pressing roller 84 which is rotated in such a carrying direction. Accordingly, the impact which the photographic paper 2 receives from the second exposure pressing roller 84 becomes extremely small so that the carrying speed of the photographic paper 2 is hardly fluctuated. In this manner, according to this embodiment, the exposure irregularity is hardly generated on the photographic paper 2 so that the quality of a print image formed on the photographic paper 2 can be largely enhanced.

Further, according to this embodiment, since the first exposure pressing roller 82 and the second exposure pressing roller 84 are connected by means of the belt 98, compared to a case in which these two pressing rollers 82, 84 are connected to each other by a simple contact of these rollers, the rotation can be surely transmitted between the pressing rollers 82, 84.

Further, in this embodiment, a surface speed of the second exposure pressing roller 84 in the state that only the first exposure pressing roller 82 is at the press-contact position is set smaller than a surface speed of the first exposure pressing roller 82 and the one-way clutch 99*a* which makes the second exposure pressing roller 84 perform idling in the carrying direction of the photographic paper 2 with respect to the belt 98 is disposed. Accordingly, one-way clutch 99*a* absorbs the difference in the carrying speed between the first exposure pressing roller 82 and the second exposure pressing roller 84 and hence, an undesired force is hardly applied to respective members. Further, when the photographic paper 2 which is carried from the first exposure carrying roller unit 80A to the second exposure carrying roller unit 80B is brought into contact with the second exposure pressing roller 84 in the state that both of two pressing rollers 82, 84 assume the press contact position, the one-way clutch 99*a* functions to make the second exposure pressing roller 84 perform idling with respect to the belt 98 so that there is no possibility that a large impact is applied to the photographic paper 2 due to the contact of the photographic paper with the second exposure pressing roller 84. Accordingly, the exposure irregularity is hardly generated on the photographic paper 2 so that the quality of the print image formed on the photographic paper 2 is still further enhanced.

Further, in this embodiment, even when the state of two pressing rollers 82, 84 is changed from the state in which both of the pressing rollers 82, 84 assume the press-contact position to the state in which only the second exposure pressing roller 84 assumes the press-contact position, the one-way clutch 99*b* functions so as to prevent an angular velocity of the first exposure pressing roller 82 from becoming faster than an angular velocity of the second exposure pressing roller 84. Accordingly, even when the portion of the photographic paper 2 in the vicinity of the rear end thereof is brought into contact with the first exposure pressing roller 82, the photographic paper 2 is not pushed to the downstream side so that the carrying speed of the photographic paper 2 is no more fluctuated. As a result, the exposure irregularity is hardly generated on the photographic paper 2 so that the quality of the print image formed on the photographic paper 2 is still further enhanced.

In addition to the above-mentioned constitutions, this embodiment can easily realize the constitution in which the surface speed of the second exposure pressing roller 84 in the state that only the first exposure pressing roller 82 assumes the press-contact position becomes smaller than the surface speed of the first exposure pressing roller 82 by adjusting the diameters of two pulleys 96, 97.

Although one preferred embodiment of the present invention has been explained heretofore, the present invention is not limited to the above-mentioned embodiment and various changes can be made within the spirit of claims. For example, in the above-mentioned embodiments, as the shaft coupling unit which couples two shafts (pressing roller supporting shafts) 91, 92, the pulley 96 which is supported on the shaft 91, the pulley 97 which is supported on the shaft 92, and the belt 98 having a circular cross-section which is extended between two pulleys 96, 97 are used. However, as the shaft coupling unit, any constitution can be used so long as the first pressing roller supporting shaft and the second pressing roller supporting shaft are coupled such that both of the first and second pressing rollers are rotated in the same direction even when only one of the first pressing roller and the second pressing roller assumes the press-contact position. Further, although the pulley and the pressing roller are separately formed in the above-mentioned embodiment, these parts may be constituted of a same member. Further, the shaft may be separately formed from the pressing roller as in the case of the above-mentioned embodiment or may be formed integrally with the pressing roller.

Further, the first one-way clutch is arranged between the second pressing roller supporting shaft and the second pulley as described in the above-mentioned embodiment, the first one-way clutch may also be arranged between the second pressing roller supporting shaft and the second pressing roller.

Further, although the second one-way clutch may be arranged between the first pressing roller supporting shaft and the first pulley in the above-mentioned embodiment, the second one-way clutch may also be arranged between the first pressing roller supporting shaft and the first pressing roller.

Further, although the roller carrying mechanism which exposes the photographic paper in two rows has been explained as the example in the above-mentioned embodiment, the roller carrying mechanism of the present invention is not limited to this example and the roller carrying mechanism maybe constituted as a roller carrying mechanism which performs the exposure in one row on the photographic paper or a roller carrying mechanism which performs the exposure in three or more rows on the photographic paper.

Moreover, although the above-mentioned embodiment describes the roller carrying mechanism mounted in the photographic processing device, the roller carrying mechanism of the present invention is not limited to the photographic processing device and the roller carrying mechanism is applicable to any appliance (for example, scanner, ink jet printer or the like) in which an image holding medium on which the printing or the reading of an image is performed is carried using rollers.

What is claimed is:

1. A roller carrying mechanism comprising:

a first carrying roller unit which includes a first driving roller, a first pressing roller which is shiftable between a press-contact position at which the first pressing roller clamps an image holding medium between the first pressing roller and the first driving roller and is capable of performing a follower rotation and a press-contact releasing position at which the first pressing roller is released from the first driving roller, and a first pressing roller supporting shaft for supporting the first pressing roller, the first carrying roller unit being arranged at the upstream side of an image processing position;

a second carrying roller unit which includes a second driving roller, a second pressing roller which is shiftable between a press-contact position at which the second pressing roller clamps the image holding medium between the second pressing roller and the second driving roller and is capable of performing a follower rotation and a press-contact releasing position at which the second pressing roller is released from the second driving roller, and a second pressing roller supporting shaft for supporting the second pressing roller, the second carrying roller unit being arranged at the downstream side of the image processing position; and a shaft coupling unit which couples the first pressing roller supporting shaft and the second pressing roller supporting shaft such that both pressing rollers are rotated in the same direction even when only one of the first pressing roller and the second pressing roller is held at the press-contact position.

2. The roller carrying mechanism according to claim 1, wherein the shaft coupling unit includes a first pulley which is supported on the first pressing roller supporting shaft, a second pulley which is supported on the second pressing roller supporting shaft, and a belt which is extended between the first pulley and the second pulley.

3. The roller carrying mechanism according to claim 2 further comprising a first one-way clutch which is disposed in a transmission system arranged between the belt and the second pressing roller and makes the second pressing roller perform idling with respect to the belt in the carrying direction of the image holding medium;

wherein a surface speed of the second pressing roller which is rotatably driven by way of the belt when only the first pressing roller assumes the press-contact position is set smaller than a surface speed of the first pressing roller.

4. The roller carrying mechanism according to claim 3 further comprising a second one-way clutch which is disposed in a transmission system arranged between the belt and the first pressing roller and makes the first pressing roller perform idling with respect to the belt in the direction opposite to the carrying direction of the image holding medium.

5. The roller carrying mechanism according to claim 3, wherein the diameter of the second pulley is larger than the diameter of the first pulley.

6. A photographic processing device being provided with the roller carrying mechanism described in claim 1.

* * * * *